April 7, 1959  V. J. LUNDELL  2,880,561
ROTARY ROW CROP CHOPPER
Filed Dec. 5, 1955
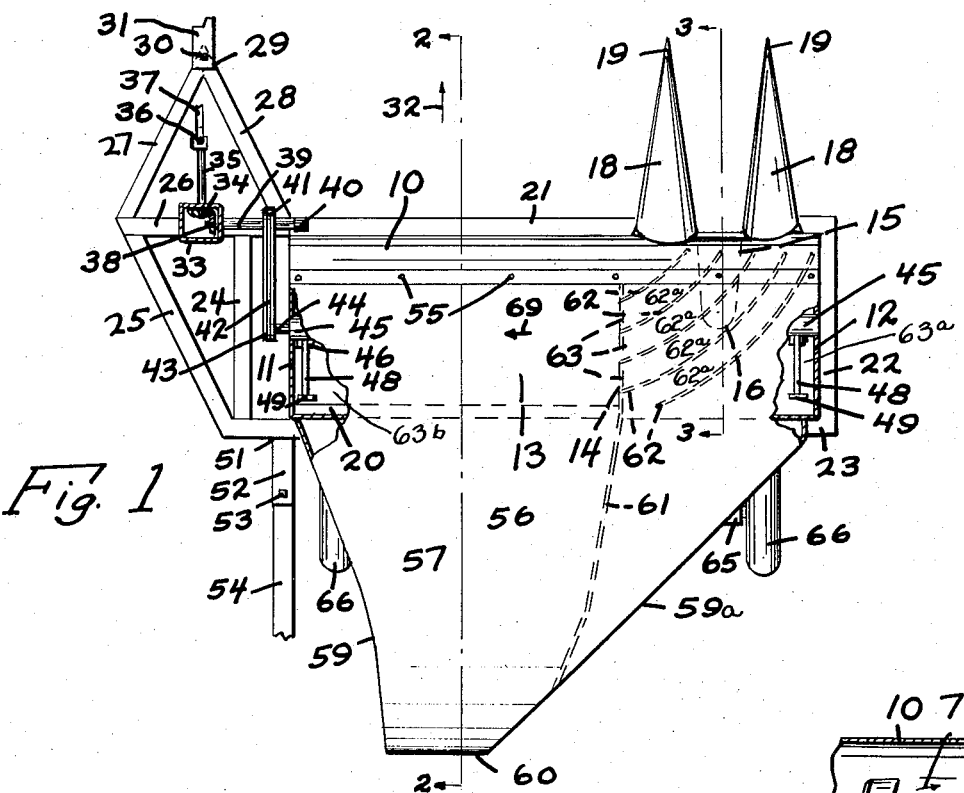
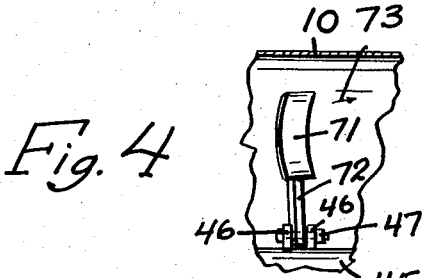
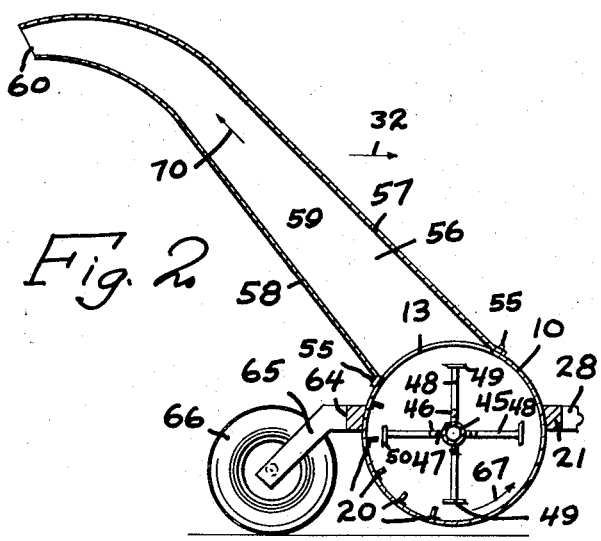
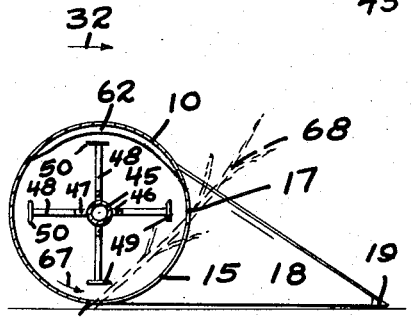
INVENTOR.
Vernon J. Lundell
BY
Sam J. Slotsky
ATTORNEY

United States Patent Office 2,880,561
Patented Apr. 7, 1959

2,880,561

ROTARY ROW CROP CHOPPER

Vernon J. Lundell, Cherokee, Iowa

Application December 5, 1955, Serial No. 551,116

1 Claim. (Cl. 56—16)

My invention relates to a hay chopper.

An object of my invention is to provide a device which includes the combination of an ensilage and corn cutter as well.

A further object of my invention is to provide a device which will pass along a row of row crop whereby the corn stalks will be efficiently gathered into the device and then chopped, and also whereby the cut stalks are thence thrown laterally into the device whereby the chopped stalks are then more thoroughly chopped and disintegrated before being directly discharged into the wagon or other receptacle accompanying the chopper.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view of the hay chopper with certain parts being taken in section, and with parts broken away, Figure 2 is a sectional view of Figure 1 taken substantially along the lines 2—2 thereof, Figure 3 is a sectional view taken along the lines 3—3 of Figure 1, and Figure 4 is a detail on an enlarged scale of a modification.

My invention contemplates the provision of a chopping device which will especially accommodate standing corn and which provides an important advantage wherein the corn stalks besides being cut at the ground, are brought directly into the device and thence the said stalks are rechopped so that they can thence be directly thrown into a receiving wagon or the like and in a very finely divided condition.

My invention pertains to that type of invention shown in my co-pending application such as the application on a Hay Chopper, Serial No. 375,445, filed August 20, 1953, now Patent No. 2,786,317, the aforesaid application pertaining to the general type of chopper.

I have used the character 10 to designate a cylindrical housing, this housing being completely cylindrical throughout its entire width from the wall 11 to the wall 12 and including a cut-out portion in the upper portion thereof at 13, which cut-out portion terminates at 14, the balance of the cylinder between the portions 14 and 12 being thereby completely closed with the exception of an opening at 15 which terminates substantially at 16 and at 17, and straddling the opening 15 is the pair of aprons or shield members 18 terminating in the points 19, it thus being noted that the opening 15 communicates directly into the cylindrical casing portion.

Attached to the balance of the cylindrical member and between the wall 11 and the point 14 are the laterally positioned cutting bars 20 which are attached to the cylindrical member 10 and which are detachable.

The characters 21, 22, 23 and 24 indicate framework portions as also do the characters 25, 26, 27 and 28, and attached at 29 to the termination of the members 27 and 28 is a suitable pin 30 which is adapted to secure these members to the draw-bar 31 of a tractor which is to draw the entire chopper in the direction of the arrow 32, the character 33 indicating a housing attached to the framework portion 26 in which housing is positioned the bevel gear 34 attached to the shaft 35 which shaft is attached to the universal joint 36 which in turn is attached to the shaft 37, which shaft 37 runs to the rear power take-off shaft of the same tractor which draws the arrangement. Meshing with the bevel gear 34 is a further bevel gear 38 which is attached to the shaft 39 which is journalled at 40, and attached to the shaft 39 are the multiple pulleys 41 over which pass the belts 42 which drive the further pulleys 43 which drive a shaft 44 which is secured to the pipe 45, and secured to the pipe 45 are the ears 46 to which are pivotally attached at 47 the hammers 48 to which are attached the blades 49 having the sharpened edges 50. The hammers 48 and blades 49 are placed at equally spaced intervals laterally along the entire length of the pipe 45, and as described in my U. S. Patent Number 2,758,435 issued August 14, 1956. Attached to the framework portion 23 as at 51 is the rearwardly extending hitch bar 52 to which can be pinned at 53 the forwardly extending tongue 54 of any wagon which is to be drawn by the arrangement, and into which the material is to be discharged.

Attached along the casing 10 as at 55 is a discharge housing indicated generally by the character 56 and which includes the upper wall 57, lower wall 58, and side walls 59 and 59a, which walls terminate at the upper discharge opening 60, and it will be noted that a further inner wall 61 is provided so that the material discharged through the opening 13 will be concentrated toward the opening 60.

Attached to the upper portion of the casing 10 and between the wall 12 and the point 14 are the arcuate deflecting bars or flanges 62 which extend downwardly toward the opening 15 between the members 18 and which also curve as shown clearly in Figure 1 toward the left-hand side of the chopper cylinder or toward the side which includes the chopping bars 20, the ends of these members 62 thereby providing conveying channels 62a being open at 63.

Attached to the framework portion 23 at 64 are the downwardly inclined brackets 65 to which are journalled the wheels 66 upon which the chopper will ride when being drawn forwardly, the balance of the chopper being supported by suitable hitching members.

The operation of the device is as follows. As the machine is drawn in the direction of the arrow 32, the various hammers 48 and blades 49 will be impelled in a rotary manner in the direction of the arrow 67, the tractor being driven so that the row of corn will pass between the members 18 and it will be observed from Figure 3 that during the rapid rotary action of the blades and hammers, the corn stalks, indicated by the dotted lines character 68, will be cut substantially at the ground level, and due to the rapid whirling action of the blades and due to the momentum imparted thereby, these stalks will be cut and chopped and carried upwardly towards the flanges 62 whereby the cut material will then be impelled in the direction of the arrow 69 (see Figure 1) between such flanges 62, this material thence being directed into the balance of the cylinder 10 at the left-hand side of Figure 1, and whereby the whirling hammers and blades at this portion will additionally continue to disintegrate and chop the material and especially due to the action of the bladed members 49 against the cutting bars 20 so that as a result when the material passes upwardly (see Figure 2) in the direction of the arrow 67, it will be discharged through the opening 13 and thence in the direction of the arrow 70 and out of the end 60 of the member 56 whereby this finely divided chopped material is then thrown into the wagon (not shown) pulled by the tongue 54. As a result there is thus provided a portion 63a which gathers and partially chops the stalks, and an additional portion 63b which receives the same and thence additionally chops the material and discharges the same as explained hereinabove.

Figure 4 illustrates a further important modification of my invention, and wherein the bars 62 need not be used, although they can be used if desired.

In this modification a somewhat concave-shaped hammer member 71 is shown, which is attached to a shank portion 72, the shank portion 72 being pivotally secured as at 47 to the ears 46, however, the shank portion 72 is bent out of a plane which is transverse to the longitudinal axis of the pipe member 45, so that as a result the member 71 is also bent at such an angle. By virtue of the fact that the member 71 is thus pitched at an angle, somewhat similar to a propeller blade, when the blades 71 are in the position shown, the effect will be for them to thereby deflect the chopped stalks in the direction of the arrow 73 toward the part of the casing which includes the opening 13, Figure 4 being a view observed from a position forwardly of the opening 15. The effect, then, of these blades, which are positioned only between the wall 12 and point 14, is to chop the stalks and thence throw them directly toward the major portion of the cylindrical member 10 which is beneath the discharge member 56, and therefore the bars 62 will not be required in this construction, although the same can be used additionally if desired.

It will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A corn stalk chopper comprising a framework, a cylindrical laterally positioned housing attached to said framework, a laterally positioned pipe mounted in said housing, a plurality of radially positioned swinging hammers attached to said pipe, said housing including an opening for receiving stalks therein as said housing travels forwardly, said housing further including a plurality of substantially laterally positioned deflecting bars for transferring chopped stalks towards one end of said housing, forwardly extending aprons attached at either side of said opening for receiving stalks therebetween, said substantially laterally positioned deflecting bars being positioned at an upper portion of said housing, a hollow discharge housing communicating with said housing.

References Cited in the file of this patent
UNITED STATES PATENTS

| | | |
|---|---|---|
| 2,517,184 | Elliott et al. | Aug. 1, 1950 |
| 2,627,155 | Shuler et al. | Feb. 3, 1953 |
| 2,659,188 | Haban | Nov. 17, 1953 |
| 2,803,101 | Lundell | Aug. 20, 1957 |